May 23, 1944.  D. W. HOPKINS  2,349,727
VALVE
Filed July 6, 1942  2 Sheets-Sheet 1
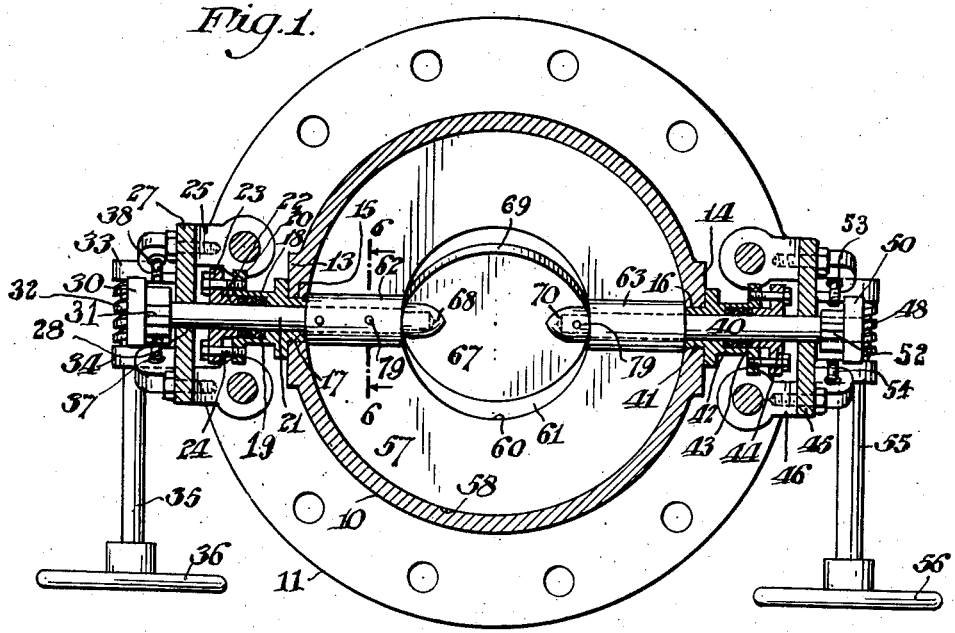
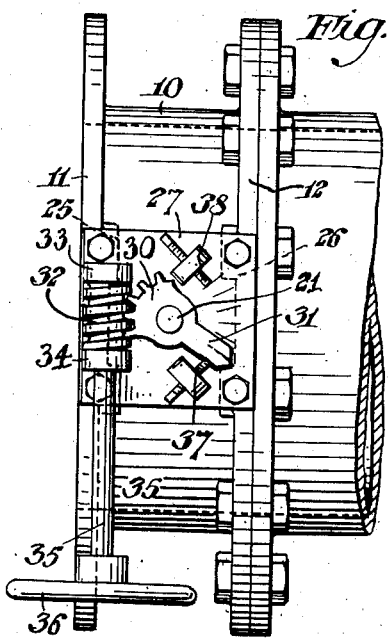 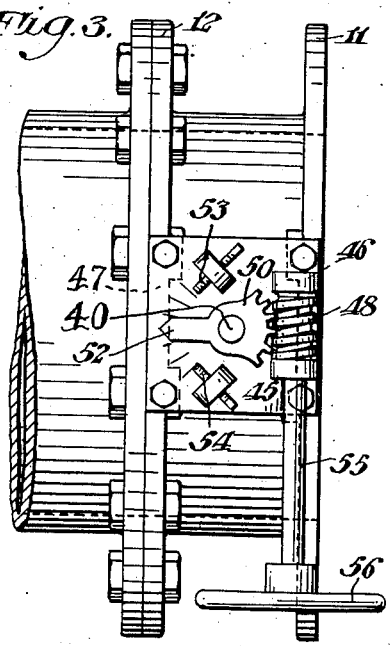
INVENTOR:
David W. Hopkins,
BY Barr, Borden + Fox
ATTORNEYS.

May 23, 1944. D. W. HOPKINS 2,349,727
VALVE
Filed July 6, 1942 2 Sheets-Sheet 2

INVENTOR:
David W. Hopkins,
BY
ATTORNEYS.

Patented May 23, 1944

2,349,727

UNITED STATES PATENT OFFICE 2,349,727

VALVE

David W. Hopkins, Philadelphia, Pa.

Application July 6, 1942, Serial No. 449,936

4 Claims. (Cl. 277—46)

This invention relates to valves, and particularly to butterfly valves.

There are many situations in which large volumes of fluid under more or less high pressure must be controlled by valves, and in which the attainment of a restricted flow following closing of the valve is attended by several adverse results. With the conventional butterfly valve, the "cracking" of the valve to start its opening requires a great expenditure of power, dangerous eddy currents or forms of cavitation are set up, which in the case of a corrosive or abrasive flow result in rapid deterioration of the valve, and friction losses are appreciable.

It is among the objects of this invention; to improve the art of valves; to provide a butterfly valve arranged to control a large opening and having also a small controllable port opening within itself; to provide a compound valve, one vane of which contains a port controlled by an independently manipulatable vane; to provide a pair of related valves arranged for alternate or simultaneous actuation; to provide a valve the operation of which is substantially free from cavitation effects; to provide in a valve a pair of coordinated balanced vanes respectively controlling large and small ports; to provide a valve of simplicity, strength and long life.

Many other objects and advantages will become more apparent as the description proceeds.

In the accompanying drawings forming part of this description,

Fig. 1 represents a transverse section normal to the flow axis of the valve, partially in full lines.

Figs. 2 and 3 represent respectively opposite partially fragmental end elevations of the valve.

Figure 4:
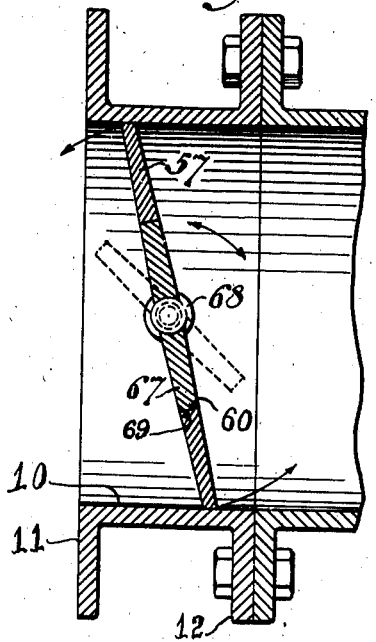
Fig. 4 represents a fragmentary diagrammatic section of the valve of this invention transverse to the pivotal axis of the butterfly vane, indicating the free rotatability of the inner or smaller vane in one form of the invention.

In the drawings, the housing preferably comprises a relatively short cylindrical valve seat section 10 extending between and having a flow axis normal to the front and rear valve flanges 11 and 12 respectively. At diametrically opposite points the housing 10 is provided with short reinforcing flattened bosses 13 and 14, and the latter are respectively provided with short radial bores, as at 15 and 16. The bore 15 contains at one side of the cylinder the axially bored bushing stuffing box 18 terminating at one end in a slightly concave face 17 coextensive with the inner periphery of valve seat 10 and at the other end in the flange 20. The large-vane shaft 21 is disposed rotatably in the bushing stuffing box and extends in one direction radially inwardly of the wall of the valve housing 10 beyond face 17, as will be described, and in the other direction the outer end of the shaft extends radially outwardly beyond the valve flanges into the geared driven relation to be described. The stuffing box 18 contains packing 19 which is compressed about the shaft 21 by the gland 22 having the flange 23 juxtaposed to the flange 20, and adjustably coupled thereto by the bolts 24, as will be clear. The front and rear flanges 11 and 12 of the valve on opposite sides of shaft 21 are each provided with flattened bosses 25 and 26 upon which the transverse plate 27 is bolted in a plane normal to the axis of the bore of the bushing stuffing box and of shaft 21. The shaft 21 extends outwardly through an aperture 28 in the plate 27, and carries the pinion gear 30 having the integral movement limiting and vane-position-indicating tail 31. The pinion gear is in mesh with the worm gear 32 journalled in bearing studs 33 and 34 on the plate 27, and is driven preferably by a shaft 35 carrying hand wheel 36, although power drive means of any desired sort, such as a hydraulic, pneumatic or electric motor with limit switches (not shown) may be used. Adjustable stops, as at 37 and 38, are mounted on the plate in position to be engaged by the tail 31 to limit the angular movements of the large vane carrying shaft 21. The valve housing on the diametrically opposite side carries preferably exactly similar but reversed elements, including the small-vane shaft 40, the bushing stuffing box 42, packing 43 and gland 44. The plate 45 is mounted on similar ears or bosses 46 and 47 on the front and rear flanges of the valve, and supports the worm gear 48 in mesh with the worm segment gear 50. In one form of worm wheel or segmental gear the tail 52 is provided moving between adjustable stops or limits 53 and 54 mounted on the plate 45. This is for use with a small vane disposition indicated in Fig. 5. The worm gear 48 is preferably driven by a shaft 55 and the hand wheel 56, although again, the shaft may be power driven if desired. The advantages of power drive include its availability for remote controlling.

Figure 5:
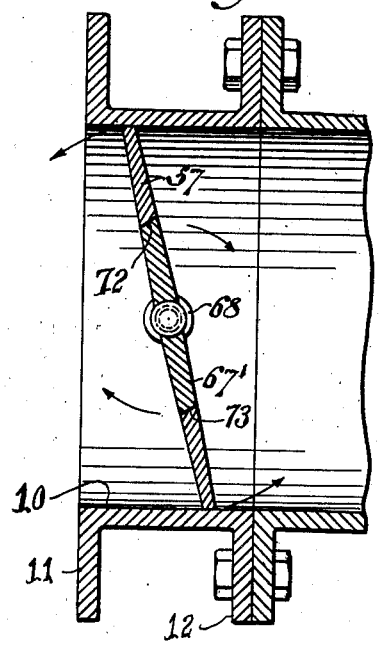
Fig. 5 represents a similar view of a modified form of valve in which the smaller or inner butterfly vane has a restricted movement from a tightly sealed relation in the larger or outer vane.
Figure 6:
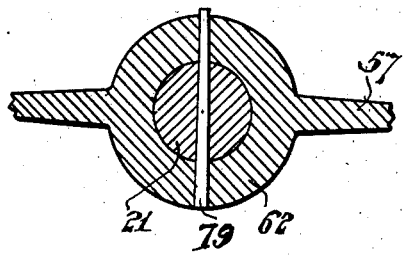
Fig. 6 represents a fragmentary section as taken on line 6—6 of Fig. 1, showing the vane and pivot construction.

A disc-like centrally apertured or ported more or less slightly oval butterfly vane 57 is provided of a diameter such as to have a sealing engagement within the valve on the valve seat 10, in a slightly inclined position as indicated in full lines in Figs. 4 and 5. Vane 57 is provided with diametrically opposed and spaced aligned channels or shaft-housings 62 and 63, each extending radially between the outer peripheral edge 58 of the disc and the internal periphery 60 of the axial aperture 61. The housings 62 and 63 may be formed in any desirable manner, but preferably are cast bosses subsequently drilled or bored.

The inner periphery 60 of the vane 57 in the preferred form is machined substantially perpendicular to the surface of the vane, so that the smaller planar port vane 67 mounted in the port 61 and having the preferably annular outer periphery 69 transversely slightly rounded has a relatively tight but not a ground seat in the aperture 61, so that in its pivoting, as later described, the inner port is controlled by a freely revoluble port vane 67. The port vane 67 has rigidly mounted diametrically spaced coaxial radially outwardly extending short apertured bosses, or housings, respectively 68 and 70.

The large-vane shaft 21 projecting inwardly beyond the seating surface 10 extends through the adjacent juxtaposed housing 62 of the vane 57, to which it is rigidly secured, either permanently, as by welding or the like, or by set-screws or pins 79 if a dismountable or temporary relationship is desired. The shaft 21 preferably extends completely through housing 62 and inwardly beyond the peripheral edge 60 of the port 61 thereof to termination in the juxtaposed housing 68 of the port vane 67, forming a gudgeon or trunnion, upon and relative to which the latter is freely pivoted. Obviously turning the hand or other wheel 36, through the train of mechanism imposes torque upon the shaft 21 and turns the vane 57 with respect to its seat in the valve housing 10, but without thereby directly affecting the position of the port vane 67 in the internal port 61 of the larger vane except as large vane movement moves port 61 relative to port vane 67.

The small-vane shaft 40 extends inwardly of the valve housing projecting completely through the adjacent shaft housing 63 with which it has no interlocking engagement, so that shaft 40 forms a gudgeon or trunnion on which the port vane 67 can swing freely. The shaft 40 is prolonged beyond peripheral edge 60 to termination in the adjacent housing or boss 70 of the small port vane, with which it is either temporarily or permanently anchored by welding or pins or the like as at 79 for coupled angular motion. With the large vane in any desired position, as for instance closed in the housing 10, manipulation of hand wheel 56 through the gear train will exert torque on the shaft 40 to swing the small vane relative to the large one.

As noted, in the preferred embodiment a tail or other position indicating means is associated with each driven shaft, as by attaching it to the segmental gear, so that the position of the respective vanes can be determined from the outside of the valve and further so that a positive stop to vane movement is provided.

It will be clear that with the vane 57 closed and the port vane 67 closed as well, the valve will be substantially tightly closed and if the valve is in a line of considerable pressure there will be an appreciable pressure differential across the valve. From this position it will be evident that the turning of the relatively small port vane, controlling the smaller port 61, will require relatively small effort or power expenditure compared to that necessary for "cracking" the vane 57, will enable the reduction of the differential pressures across the valve if the larger vane is then or subsequently to be opened, and affords a fluid passage through the center of the valve that will be of inappreciable cavitation or scarifying qualities in the event of use with corrosive fluids or those carrying abrasives in suspension. If the volume of flow is to remain small, the port vane is the only one which is opened and the erosion on the larger valve seat will be avoided as will the power expenditure usually necessary for moving larger vanes such as vane 57.

Figure 7:
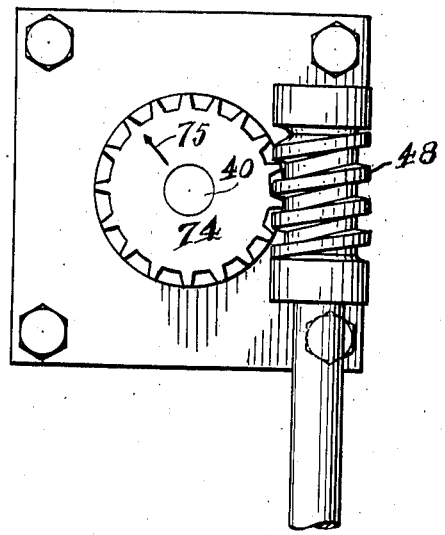
Fig. 7 represents a fragmentary end elevation of the valve according to the form shown in Fig. 4, with a gear train such as to enable free rotation of the inner or smaller vane relative to the larger one.

It will be understood that as shown in Fig. 5 the inner port may have inclined peripheral edges 72 machined so that the port defined thereby has an axis angularly divergent from the normal to the plane of the vane 57, whereby the port vane 67', the peripheral edge of which is complementally machined as at 73, while having a range of movement far smaller than that of port vane 67 of the first described form as shown in Fig. 4, can be opened from a position of a tight seal to full open and to return to a tight seal if desired. Similarly the worm wheel for either shaft may comprise a complete gear as at 74 in Fig. 7 and may bear an arrow 75 indicative of position of the coupled vane if the freely rotatable port vane of Fig. 4 is desired, or if the large vane is to be similarly susceptible to free rotation for any reason. In this latter event, of course, the vane 67 will be cylindrical instead of slightly oval as shown.

The many advantages of the invention will be clear to those skilled in the art.

Having thus described my invention, I claim:

1. A valve comprising an annular valve housing, a vane disposed in the housing, shaft housings disposed coaxially on the vane on a diameter thereof, said vane having a port, a port vane disposed in the port, a pair of diametrically spaced short apertured bosses comprising shaft housings on the port vane on a diameter thereof with the center of the port vane between bosses clear of protuberances, a shaft journalled in the valve housing and extending through aligned shaft housings on the vane and port vane and terminating in the latter and coupled to the port vane, a second shaft aligned with the first shaft journalled in the valve housing and extending through aligned shaft housings on the vane and port vane and terminating in the latter and coupled to said vane, and irreversible gear means operatively coupled to the outer ends of the respective shafts to position said vanes and to anchor the respective vanes against undesired movement.

2. A valve comprising an annular valve housing, a vane disposed in the housing, shaft housings disposed coaxially on the vane on a diameter thereof, said vane having a port, a port vane disposed in the port, shaft housings on the port vane on a diameter thereof, a shaft journalled in the valve housing and extending through aligned shaft housings on the vane and port vane and coupled to the port vane, a second shaft aligned with the first shaft journalled in the valve housing and extending through aligned shaft housings on the vane and port vane, and coupled to said vane, a pair of parallel apertured plates mounted on the valve housing on diametrically opposite sides thereof with the respective apertures therein receiving the respective shafts, a pinion gear keyed on each shaft overlying the adjacent respective plates, a worm gear in mesh with each of the respective pinion gears and journalled on the respective plates, and means for turning the respective worm gears to move the respective coupled vane or port vane without thereby moving the other port vane or vane respectively and indicating means operatively associated with the respective pinion gears to continuously indicate the angular setting of the vane coupled to the pinion gear.

3. A valve comprising an annular valve housing, a vane disposed in the housing, shaft housings disposed coaxially on the vane on a diameter thereof, said vane having a port, a port vane disposed in the port, shaft housings on the port vane on a diameter thereof, a shaft journalled in the valve housing and extending through aligned shaft housings on the vane and port vane and coupled to the port vane, a second shaft aligned with the first shaft journalled in the valve housing and extending through aligned shaft housings on the vane and port vane, and coupled to said vane, a pair of parallel apertured plates mounted on the valve housing on diametrically opposite sides thereof with the respective apertures therein receiving the respective shafts, a pinion gear keyed on each shaft overlying the adjacent respective plates, a worm gear in mesh with each of the respective pinion gears and journalled on the respective plates, means for turning the respective worm gears to move the respective coupled vane or port vane without thereby moving the other port vane or vane respectively, each of said pinion gears having integral indicating means overlying the plate, and said plate carrying indicia relative to which the indicating means can be observed to determine the attitude of the vane coupled thereto.

4. A valve comprising an annular valve housing, a vane disposed in the housing, shaft housings disposed coaxially on the vane on a diameter thereof, said vane having a port, a port vane disposed in the port, shaft housings on the port vane on a diameter thereof, a shaft journalled in the valve housing and extending through aligned shaft housings on the vane and port vane and coupled to the port vane, a second shaft aligned with the first shaft journalled in the valve housing and extending through aligned shaft housings on the vane and port vane, and coupled to said vane, a pair of parallel apertured plates mounted on the valve housing on diametrically opposite sides thereof with the respective apertures therein receiving the respective shafts, a pinion gear keyed on each shaft overlying the adjacent respective plates, a worm gear in mesh with each of the respective pinion gears and journalled on the respective plates, means for turning the respective worm gears to move the respective coupled vane or port vane without thereby moving the other port vane or vane respectively, each of said pinion gears having an integral finger extending from the gear opposite to the teeth thereof, and adjustable stop means located on the plate in the path of said finger to limit the adjustment of the vane coupled thereto.

DAVID W. HOPKINS.